United States Patent
Salim et al.

(10) Patent No.: US 7,620,735 B2
(45) Date of Patent: Nov. 17, 2009

(54) INTERACTIVE VOICE ENABLED EMAIL NOTIFICATION AND ALERT SYSTEM AND METHOD

(75) Inventors: Mohammad Salim, Boulder, CO (US); Wayne Sheppard, Arvada, CO (US); Barbara Rossner, Boulder, CO (US)

(73) Assignee: Corybant, Inc., Boulder, CO (US)

( * ) Notice: Subject to any disclaimer, the term of this patent is extended or adjusted under 35 U.S.C. 154(b) by 1223 days.

(21) Appl. No.: 10/503,355

(22) PCT Filed: Nov. 20, 2003

(86) PCT No.: PCT/US03/37297

§ 371 (c)(1),
(2), (4) Date: Jul. 30, 2004

(87) PCT Pub. No.: WO2004/046895

PCT Pub. Date: Jun. 3, 2004

(65) Prior Publication Data

US 2005/0089019 A1    Apr. 28, 2005

Related U.S. Application Data

(60) Provisional application No. 60/427,543, filed on Nov. 20, 2002.

(51) Int. Cl.
    G06F 15/16    (2006.01)
(52) U.S. Cl. .................. 709/246; 709/206; 709/231; 709/238
(58) Field of Classification Search .......... 709/201, 709/203, 231, 246, 206, 238
    See application file for complete search history.

(56) References Cited

U.S. PATENT DOCUMENTS

| | | |
|---|---|---|
| 4,714,995 A | 12/1987 | Materna et al. |
| 5,187,787 A | 2/1993 | Skeen et al. |
| 5,202,996 A | 4/1993 | Sugino et al. |
| 5,319,543 A | 6/1994 | Wilhelm |
| 5,339,434 A | 8/1994 | Rusis |
| 5,596,744 A | 1/1997 | Dao et al. |
| 5,627,764 A | 5/1997 | Schutzman et al. |
| 5,640,546 A | 6/1997 | Gopinath et al. |
| 5,666,490 A | 9/1997 | Gillings et al. |
| 5,666,553 A | 9/1997 | Crozier |
| 5,677,997 A | 10/1997 | Talatik |
| 5,678,041 A | 10/1997 | Baker et al. |
| 5,706,452 A | 1/1998 | Ivanov |
| 5,721,912 A | 2/1998 | Stepczyk et al. |
| 5,721,913 A | 2/1998 | Ackroff et al. |
| 5,724,406 A | 3/1998 | Juster |

(Continued)

OTHER PUBLICATIONS

Feigenbaum, Edward, Computing Machinery and Intelligence, "Computers and Thought," 1963, pp. 11-35, McGraw Hill, New York.

(Continued)

Primary Examiner—Phuoc Nguyen
(74) Attorney, Agent, or Firm—Donald R. Boys; Central Coast Patent Agency, Inc

(57) ABSTRACT

An interactive, voice-enabled email message notification and alert system 10 and method are disclosed. The system 10 relates to computer and communication systems and more particularly to delivery of electronic mail and other forms of electronic messages over the public switched and wireless telephone networks.

11 Claims, 6 Drawing Sheets

U.S. PATENT DOCUMENTS

| | | | |
|---|---|---|---|
| 5,734,837 A | 3/1998 | Flores et al. | |
| 5,745,687 A | 4/1998 | Randell | |
| 5,745,692 A | 4/1998 | Lohmann, II et al. | |
| 5,754,857 A | 5/1998 | Gadol | |
| 5,768,506 A | 6/1998 | Randell | |
| 5,774,661 A | 6/1998 | Chatterjee et al. | |
| 5,790,789 A | 8/1998 | Suarez | |
| 5,790,809 A | 8/1998 | Holmes | |
| 5,799,297 A | 8/1998 | Goodridge et al. | |
| 5,826,020 A | 10/1998 | Randell | |
| 5,842,205 A | 11/1998 | Brann | |
| 5,874,954 A | 2/1999 | Kilmer et al. | |
| 5,878,398 A | 3/1999 | Tokuda et al. | |
| 5,890,130 A | 3/1999 | Cox et al. | |
| 5,890,133 A | 3/1999 | Ernst | |
| 5,893,911 A | 4/1999 | Piskiel et al. | |
| 5,915,115 A | 6/1999 | Talati | |
| 5,937,388 A | 8/1999 | Davis et al. | |
| 5,999,940 A | 12/1999 | Ranger | |
| 5,999,942 A | 12/1999 | Talati | |
| 6,073,109 A | 6/2000 | Flores et al. | |
| 6,078,326 A | 6/2000 | Kilmer et al. | |
| 6,088,679 A | 7/2000 | Barkley | |
| 6,138,156 A | 10/2000 | Fletcher et al. | |
| 6,148,337 A | 11/2000 | Estberg et al. | |
| 6,161,007 A | 12/2000 | McCutcheon et al. | |
| 6,185,603 B1* | 2/2001 | Henderson et al. | 709/206 |
| 6,189,104 B1 | 2/2001 | Leppek | |
| 6,212,550 B1 | 4/2001 | Segur | |
| 6,397,191 B1 | 5/2002 | Notani et al. | |
| 6,438,217 B1* | 8/2002 | Huna | 379/88.14 |
| 6,539,404 B1 | 3/2003 | Ouchi | |
| 6,697,865 B1 | 2/2004 | Howard et al. | |
| 6,782,414 B1* | 8/2004 | Xue et al. | 709/206 |
| 6,965,917 B1* | 11/2005 | Aloni et al. | 709/206 |
| 7,392,306 B1* | 6/2008 | Donner et al. | 709/224 |
| 2001/0033639 A1 | 10/2001 | Martin | |
| 2003/0149761 A1* | 8/2003 | Baldwin et al. | 709/224 |

OTHER PUBLICATIONS

Adams, James L., Conceptual Blockbusting—A Guide to Better Ideas, 1986, pp. 1-10; 83-101, Perseus Books, Cambridge, Massachusetts.

Humphrey, Watts S., Managing the Software Process, 1990, pp. 72-80, Addison-Wesley Publishing Company, Reading, Massachusetts.

Senge, Peter M., The Fifth Discipline, The Art and Practice of The Learning Organization, 1990, pp. 273-301, Doubleday Currency, New York.

Smith, Preston, Developing Products in Half The Time, 1991, pp. 3-6, Van Nostrad Reinhold, New York.

Brunt, Ron, OPENframework—The Systems Architecture: an Introduction, 1992, Prentice Hall, New York.

Hampden-Turner, Charles, The Seven Cultures of Capitalism, 1993, pp. 163-196, Doubleday Currency, New York.

Miller, Lawrence M., Whole System Architecture—Beyond Reengineering: Designing the High Performance Organization, 1994, pp. 263-290, The Miller Consulting Group, Inc., Atlanta, Georgia.

Hollingsworth, David, Workflow Management Coalition The Workflow Reference Model, 1994, Workflow Management Coalition, Belgium.

The Common Object Request Broker: Architecture and Specification, Revision 2.0, 1995.

International Standard CEI IEC 601-1-4,1996, Collateral Standard Programmable Electrical Medical Systems.

Van Hoff, Arthur, The Open Software Description Format, 1997, W3C Consortium.

Business Services Architecture: the Integration of Software Components and Common Services Infrastructure, 1998 A NAC Position paper.

Conallen, Jim, Building Web Applications with UML, 1999, Addison-Wesley, Reading, Massachusetts.

* cited by examiner

INTERACTIVE VOICE ENABLED EMAIL NOTIFICATION AND ALERT SYSTEM AND METHOD

CROSS-REFERENCE TO RELATED APPLICATIONS

The application claims priority to U.S. provisional patent application No. 60/427,543, filed 20 Nov. 2002 and entitled, "Interactive Voice Enabled Email Notification and Alert" (the '543 application). This application is related to U.S. nonprovisional patent application Ser. No. 09/765,964, filed on 19 Jan. 2001 and entitled, "Method and Apparatus for Implementing an Active Information Model" (the '964 application), which claims priority to U.S. provisional patent application No. 60/176,983, filed 19 Jan. 2000 and entitled, "Datasource Harmonizer" (the '983 application). The '543 application, the '964 application, and the '983 application are hereby incorporated by reference as though fully set forth herein.

BACKGROUND OF THE INVENTION a. Field of the Invention

This invention relates to computer and communication systems and more particularly to delivery of electronic mail (email) and other forms of electronic messages over the public switched and wireless telephone networks.

b. Background Art

Telephone communication and digital information exchange including electronic mail are two common methods of communicating, using two seemingly independent technological disciplines. With the recent advances in information technology and telecommunications, the components for implementing systems that serve these two areas are beginning to overlap. However, using devices from one area to serve in the other remains a product development challenge.

The market need for a solution to provide telephone communication and digital information exchange over a single user device can be ascertained by considering the great many products that have been introduced and purchased over the last few years. The inherent complexities in the creation of a coherent solution are also evident by the difficulty of use, the high rate of failure, and the proprietary nature of the available solutions. These complexities result in difficult-to-use, costly solutions, and product offerings that are expensive to integrate into enterprise information systems.

Traditional approaches to enable an individual (1) to receive email messages and other forms of electronic notification over any telephone, (2) to redirect these notifications and associated electronic documents to a different destination (such as a fax machine), and (3) to respond to these messages, include defining an operational domain within which this service is available, thereby restricting and limiting the usefulness of the solution. An operational domain may be an email domain, a telephone network, or a community of professionals who work for an enterprise, or a department within an enterprise. These boundaries are adopted to simplify the problem of implementing a coherent system for voice communication and information delivery and access in systems that rely on central control or systems that are provided by a single vendor.

BRIEF SUMMARY OF THE INVENTION

There remains a need for a system to provide telephone communication and digital information exchange over a single user device, and it is an object of the disclosed invention to provide a system that fulfills this need. The present invention is a unique aggregation of independent software components that can be deployed within a single computer system or distributed over a network of computers.

The Interactive Voice Enabled Email Notification and Alert system of present invention, which is also referred to herein as IVEENA™ (IVEENA is the trademark owned by Corybant, Inc. under which the service described herein is offered to consumers), is a software system that provides a crossover mechanism, for a specific purpose of enabling a single individual (1) to receive email messages and other forms of electronic notification over any telephone, (2) to redirect these notifications and associated electronic documents to a different destination (such as a fax machine), and (3) to respond to these messages immediately.

In one form, the present invention comprises a notification and alert system that comprises (i) a first means that receives a first message in a first format from a first message source; (ii) a second means that processes the first message into a second message in a second format for transmission to a second message destination, wherein the second format is different from the first format, and wherein the first message source is different from the second message destination; and (iii) a third means for transmitting the second message to the second message destination. The message source and the message destination may be telephones, PDAs, computers, voicemail systems, network monitoring systems, pagers, facsimile devices, satellite telephones, radios, or other devices that are capable of receiving electronic messages. The first messages may be a digital message, for example, an email message, a HTTP stream, a network alert condition, or some other form of network message based upon TCP/IP and compatible protocols. The second message may be, for example, a digital voice message. Alternatively, the first message may be a digital voice command, and the second message may be an electronic notification (e.g., a digital email message or a database record).

In one form, the invention may be configured to accepts user preferences. These preferences may include, for example, (a) scheduling (e.g., when the user desired to be contacted), (b) whether the system is on or off (i.e., the user may decide to completely disable the notification and alert system temporarily), (c) the second message destination (i.e., the user may freely designate where that user wants to receive notifications and alerts), (d) message selection and filtering criteria (i.e., the user may provide and update the parameters used by the system when determining when a notification or alert is desirable), and (e) an option to temporarily suspend or interrupt scheduled calling (i.e., this is an alternative to completely shutting the system down and then having to re-activate the system later). The user may make these preferences known to the system via multiple sources, including any telephone or a browser connected to a global computer networks.

The system of the present invention may have a public side and a private side. The public side may be connected to at least one of (i) a global computer network (e.g., the Internet), (ii) public switched telephone networks via a voice service, and (iii) World Wide Web services including Web application servers and Web servers. The private side of the system may maintain information about the first and second messages until application requirements for these first and second messages are satisfied.

In yet another form, the invention comprises a notification and alert system that tracks user and action data for configuration management, policy enforcement, and integration with multiple level billing, accounting, and auditing systems. In this form, the notification and alert system comprises (i) an accepting means that accepts a first message in a first format from a first message source, wherein the first message comprises user and action data; (ii) a converting means that converts the first message into a second message in a second format for delivery to a second message destination, wherein the second format is different from the first format, and wherein the first message source is different from the second message destination; (iii) a delivery means for delivering the second message to the second message destination; and (iv) a tracking means for tracking the user and action data.

In still another form, the invention comprises a user-centric system for transforming and exchanging information elements. In this form, the system comprising (i) one computer or a plurality of networked computers, and (ii) a software engine running on that computer. If a plurality of networked computer are used, the computers may be running different operating systems. The software engine comprises (i) a first means for identifying an information source within the user-centric system and for identifying information elements from the information sources; (ii) a second means for transforming at least one of the identified information elements, according to a first plurality of translation rules, into at least one transformed information element; (iii) a third means for identifying an information destination within the user-centric system, wherein the third means accepts a user-selectable information destination; and (iv) a fourth means for exchanging the at least one transformed information element between the information source and the information destination.

The invention also comprises a method of notifying and alerting at least one system user of the arrival of an electronic notification that has been selected based upon a specified criteria. This method comprising the steps of (i) establishing access to a computer network; (ii) receiving via the computer network a first message in a first format from a first message source; (iii) processing the first message into a second message in a second format for transmission to a second message destination, wherein the second format is different from the first format, and wherein the first message source is different from the second message destination; and (iv) transmitting the second message to the second message destination. The "electronic notification" may be, for example, an email message, and the receiving step may further comprise receiving the email message from the first message source.

In yet another form, the present invention comprises a method of notifying and alerting a system user of the arrival of a selected electronic notification selected based upon a user-specified criteria. The method comprises the steps of (i) establishing access to a computer network; (ii) receiving via the computer network a first message in a first format from a first message source; (iii) processing the first message into a second message in a second format for transmission to a second message destination, wherein the second format is different from the first format, and wherein the first message source is different from the second message destination; (iv) transmitting the second message to the second message destination; (v) receiving via the computer network a third message in a third format from a third message source, wherein the third message source is different from the first message source; (vi) processing the third message into a fourth message in the second format for transmission to the second message destination; and (vii) transmitting the fourth message to the second message destination.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
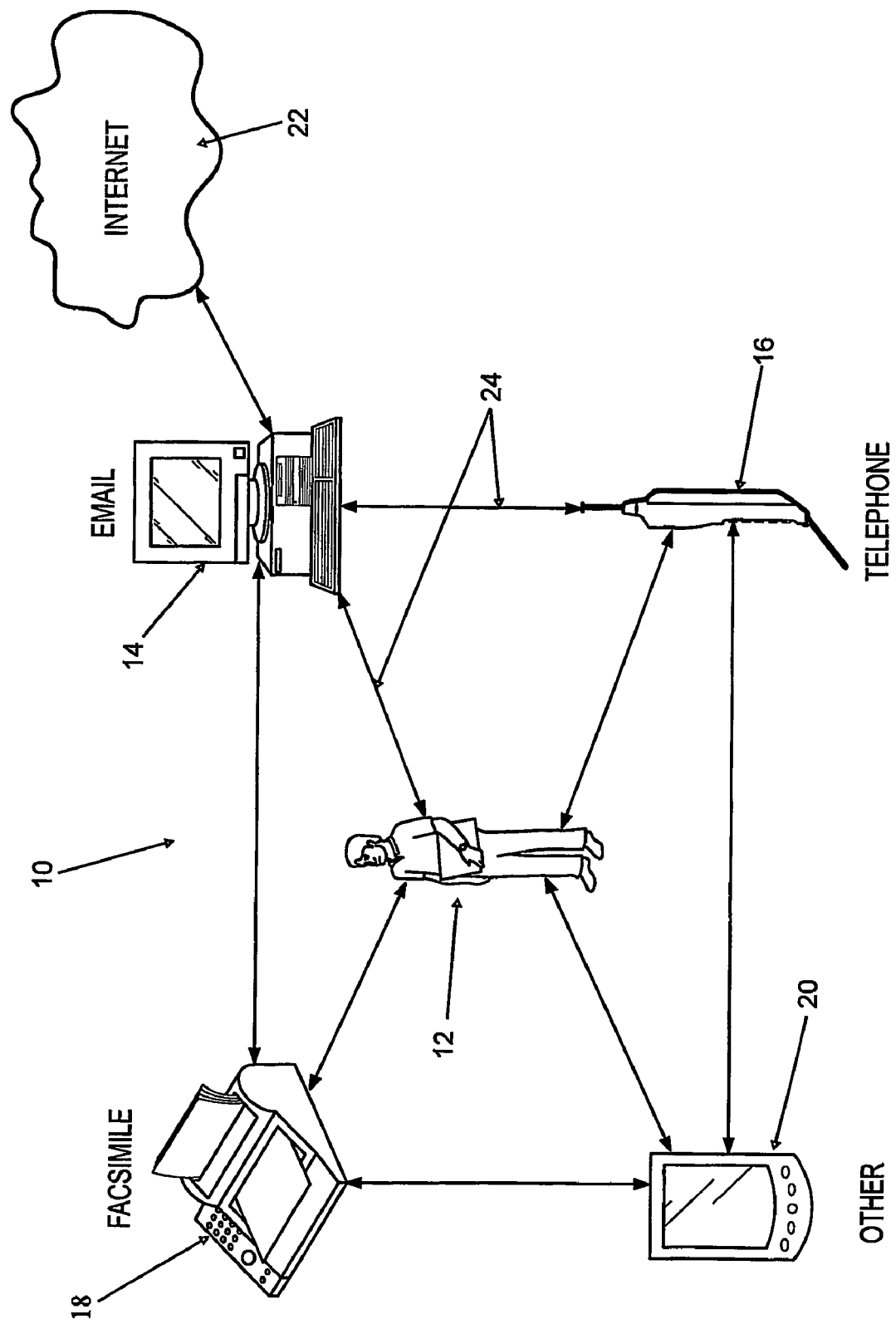
FIG. 1 is an schematic representation of one possible implementation of the present invention.

IVEENA is a widely-distributed software system 10 implemented by a unique combination of commercially available software components that work independently, including the following:

Post Office Protocol Version 3 (POP3) (see Appendix A, item 1);
Simple Mail Transfer Protocol (SMTP) (id. at item 2);
Structured Query Language SQL (id. at item 3);
Voice eXtensible Markup Language (VoiceXML) (id. at item 4);
JavaBean™ (id. at item 5);
Servlets (id. at item 6);
Component-Based Distributed Applications (id. at item 7);
Unified Modeling Language (UML) (id. at item 8);
Extensible Markup Language (XML) (id. at item 14); and
Simple Object Access Protocol (SOAP) (id. at item 15).

IVEENA can be implemented to work on a single computer or on a collection of computers that are connected through one or more public or private networks. FIG. 1 is a schematic representation of one possible implementation of the present invention. In this figure, the IVEENA system 10 enables a user 12 to receive, for example, email messages 14 via a telephone 16. For example, the system 10 enables the user 12 to have an email message 14 that meets certain user-defined parameters trigger a telephone call to the user 12 during which software components convert the textual email message to an oral message that is read to the user over the telephone 16 by a speech synthesizer.

After listening to the email message 14, the user 12 may forward the email message and/or a document that was attached to the email message to, for example, a facsimile device 18 or other electronic communication or data processing device 20 (e.g., a network monitoring system, a personal digital assistant (PDA), or a pager), or to another individual. Alternatively, the user 12 may respond to the email message orally, and the system 10 is able to forward the user's oral reply to the sender of the original email message. If the user elects to forward the original email message to another individual, the user may provide an oral message to accompany the original email message as forwarded. The system 10 may be instructed to convert the user's oral response or forwarding message into text to accompany the original message that is being forwarded. The feature labeled "Internet" 22 in FIG. 1 may comprise the various software components, servers and other computers, workstations, terminals, networks, databases, and other data sources employed by the system 10, as described further below. As represented by the connection lines 24 in FIG. 1, the system 10 enables communication between and among all of the devices 14, 16, 18, 20.

Description of the Building Blocks of IVEENA Depicted in FIGS. 2A-2I

The IVEENA system 10 (FIG. 1) performs its functions by activating multiple instances of a relatively small set of software components, including the following:
Communication Server
Service
Database
Session Object
Message
Queue
Message Triggered Object (MTO)
Network Communication Object (NCO)
Scheduler These software components or elements or "building blocks" of the IVEENA system 10 are depicted in FIGS. 2A-2I. In particular, FIGS. 2A-2I depict nine different symbols that are used in FIGS. 3-6 to represent system building blocks used by the IVEENA system 10 as it performs various functions. The symbols signify system components that implement specific system functions and have a predefined behavior and predefined interfacing rules.

Figure 2A:
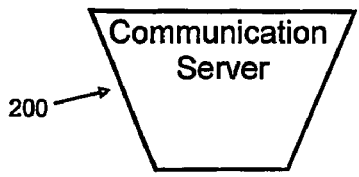
FIGS. 2A-2I depict the various symbols used in FIGS. 3-6.

FIG. 2A depicts a symbol 200 for a Communication Server. A Communication Server is a software system or program that can receive electronic information and store that information. A Communication Server that is used by IVEENA can be configured to select the messages that it will process based upon a predefined set of rules (a selector or a filter). In the existing embodiments of the invention, IVEENA uses servers that implement two common communication protocols, namely POP3 and SMTP. The Communication Server operates within the context of wireless and wired Local Area Networks (LANs), Wide Area Networks (WANs), Public Switched Telephone Networks (PSTNs), and Public Internet. It can interface to inter-carrier messaging methodologies such as Short Messaging System (SMS) and can accommodate a range of standard communication protocols including SNMP (see Appendix A, item 10), HTTP (id. at item 11), TCP (id. at item 12), and UDP (id. at item 13).

Figure 2B:
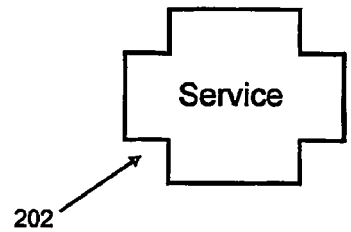

FIG. 2B depicts a symbol 202 for a Service. The IVEENA system has the ability to use Services that are available over the public (or private) networks as an integral part of the application that it implements. In the current embodiment of the invention, IVEENA uses the standard industry protocols such as XML, SOAP, and popular vendor offerings such as J2EE (see Appendix A, item 16) for external communication. The IVEENA product that is commercially offered uses a Voice Service (id. at item 4) to deliver voice messages over telephone networks and enables users to respond via voice or tone selection, commercially available Internet facsimile services, and a number of email message services.

Figure 2C:
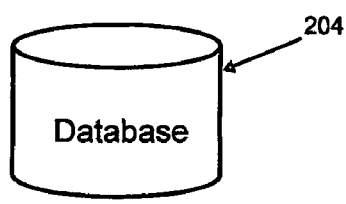

FIG. 2C depicts a symbol 204 for a Database. A Database is one or more secure databases (see Appendix A, item 3) that contain the persistent information for the IVEENA system. IVEENA allows for the case where the Database is a part of the enterprise information system and its access to the database may be, at a basic level, a query of one of the following forms:
SELECT*FROM table WHERE 'a'='a1' AND 'b'='b1' . . .
and
INSERT INTO table WHERE 'a'='a1' AND 'b'='b1' . . .

Figure 2D:
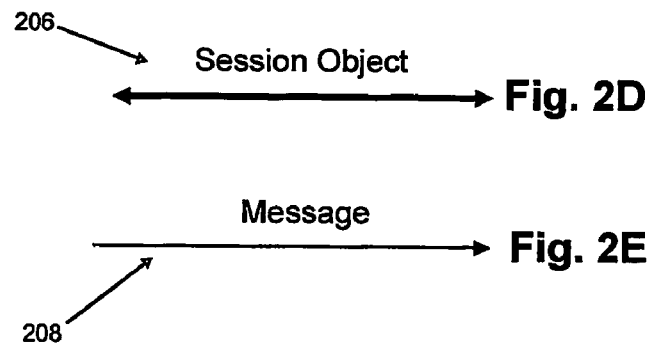

FIG. 2D depicts a symbol 206 for a Session Object. A Session object is a stateless software elements that is administered systematically and is available to the distributed elements of the IVEENA system. These objects provide access to the Database. This characteristic of the system makes it possible to integrate IVEENA into existing information systems rapidly and allows the system administration of these information systems to continue independently of the IVEENA system. For example, an enterprise may move the physical location of a database system or move certain parts of the database to another system. In the current embodiment of the invention, these Session Objects are implemented as EJB™ Session Beans (see Appendix A, items 5 & 7).

Figure 2E:
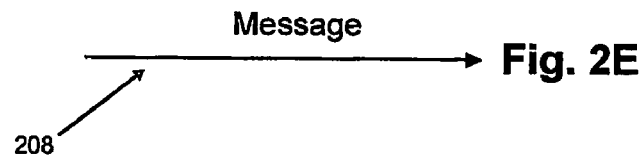

FIG. 2E depicts a symbol 208 for a Message. A Message is a unit of information that is transmitted between two elements of the IVEENA system. In the current implementation, a Message is implemented as a table of name-value pairs and may include other Messages as an element.

Figure 2F:
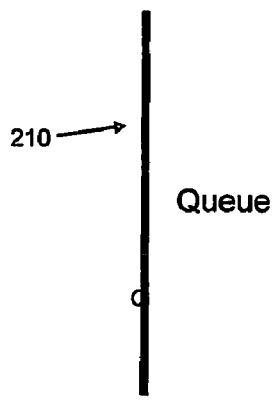

FIG. 2F depicts a symbol 210 for a Queue. A Queue is a mechanism for storing and dispensing Messages. This mechanism is used by the elements of IVEENA and is not accessible externally. Communications between the elements of IVEENA are atomic at each transaction. Elements of the IVEENA system do not share any information that is not "passed" through this messaging mechanism. Consequently, the Queue mechanism can operate over a network, thereby enabling IVEENA to operate reliably and securely over multiple computer systems, public networks, or private networks. This capability is important for integrating IVEENA into existing environments as well as enabling an enterprise that uses IVEENA to change elements of its information system incrementally over time. A Queue is a mechanism to pass Messages between the elements of IVEENA. IVEENA does not depend on its Queues to maintain their state in case of a system failure. Instead the operating protocols within IVEENA make it possible to restore the state of the system transactions from the Database.

Figure 2G:
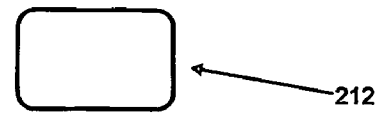

FIG. 2G depicts a symbol 212 for a Message Triggered Object (MTO). MTOs are state-full software elements (objects) that are used in conjunction with a Queue and perform the functions that are associated with that Queue. When a Message is sent to a Queue that serves a function, and when system resources are available, a MTO is created to process that Message. The overall operation logic of each application is defined by directing Messages to the appropriate Queues. During the process of creating an application, the application developers identify basic operations of that application and if needed create the appropriate MTOs. There are certain conditions where a Message may reflect a state that extends beyond the execution state of an MTO. For example, in the case where IVEENA is used to deliver email messages via telephone, when two email messages for the same user are received a short time interval apart, it will trigger two independent chains of events with unpleasant results for the user. The design of the IVEENA system incorporates an abstract concept of "Application Context" to enable developers to manage these situations at the level of application design. IVEENA enforces this abstract concept through a convention. Information reflecting the high-level concepts, such as the user state information, is stored independently as database records. Although the process of invocation of an MTO is automatic, each MTO, upon activation, may check the user state and suspend operation if there is another MTO operating on behalf of that transaction. In the case of the example above, only one MTO is responsible for, handling email messages within an activation period. In the current embodiment of the invention, Message Triggered Objects are implemented as EJB Message Driven Beans (see Appendix A, items 5 & 7).

Figure 2H:
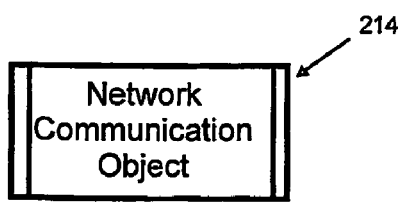

FIG. 2H depicts a symbol 214 for a Network Communication Object (NCO). An NCO is a network-accessible software module that implements a standard network communication protocol for exchanging information with another network device. A number of such components are used in the industry, and many such components can serve this function for IVEENA. For its existing embodiments, IVEENA uses JAVA™ Servlet objects (see Appendix A, item 6). These modules are visible from a public network and provide access into and out of the IVEENA system.

Figure 2I:
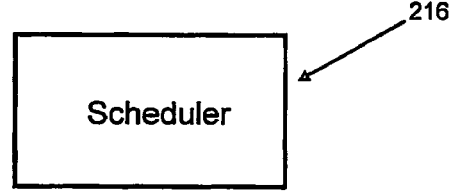

FIG. 2I depicts a symbol 216 for a Scheduler. A Scheduler is a program within IVEENA that is activated periodically and serves as a task scheduler that monitors pending actions and reactivates system elements.

Each computer that supports the operation of IVEENA hosts one or more of each of these software components or building blocks. IVEENA is flexible and scalable so that it can easily integrate into existing environments and can accommodate changes in those environments over time. To achieve this flexibility and scalability, these building blocks meet the following criteria:

Each building block performs a complete task.

Each building block receives all of the information that it needs to performs its tasks from its input and delivers all of the information that it creates in its processing, i.e., there is no need for one building block to "look inside" another building block for any information.

Each building block is constructed from one or more software components that are commonly used in the industry or offered as a service or a product by multiple suppliers.

Each building block supports a communication protocol that is propagated by national or international standards group.

Figure 3:
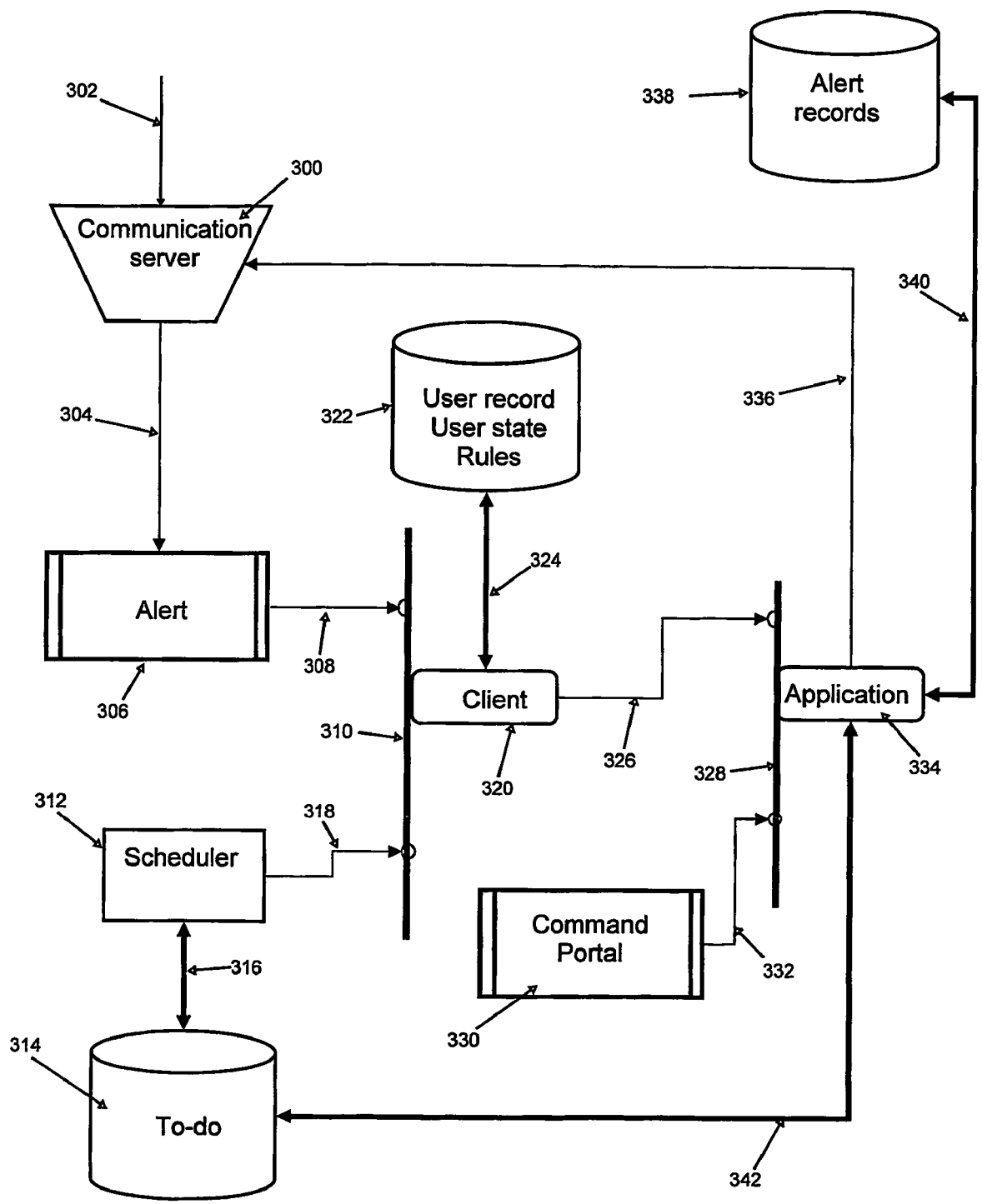
FIG. 3 outlines the process of activating an IVEENA Application.

Steps Demonstrated in FIG. 3

FIGS. 3-6 trace the flow of information through the system 10 in four sample scenarios. In cases where an example may help clarify a topic, the following description uses an event, whereby an email message containing a destination and a specific textual content is received by IVEENA, and is to be delivered to an individual over a telephone as a voice message. We refer to this example as "mailreader."

Referring first to FIG. 3, the process of activating an IVEENA "Application" is described next An "Application" is a function that the IVEENA system 10 performs for the user 12 or the enterprise. Such a process may be initiated through a direct command that is relayed through an NCO, by a Client agent within IVEENA that is instantiated in response to a scheduled action, or by an event that is received through a Communication Server, such as receiving an email message from a mail server.

In FIG. 3, the Communication Server 300 receives an electronic message 302. The Communication Server 300 applies its selection criteria and, if this electronic message passes this criteria, the Communication Server 300 sends a Message 304 that activates the "Alert" NCO 306. For example, in the case where IVEENA is serving as a "mailreader," an email message is received by an email message server (a POP3 server) that is associated with IVEENA and is addressed to an IVEENA user. The user may have specified a selection criterion, such as "I will accept only email messages from domain abcd.com". The Communication Server 300 selects the email message based upon the selection criteria and triggers the Alert NCO 306. The "Alert" NCO 306 creates a Message 308 containing a user's external identification and posts it with the "Client" queue 310.

The Scheduler 312 searches the "to-do" records in the Database 314, as represented by the Session Object 316, to find an event record whose execution time is less than the current time, i.e., to find any pending tasks that needs to be performed at this time. An example of such an event is an email message that failed to be delivered in earlier attempts because the service or the recipient was unavailable. When a pending event is ready for execution, the Scheduler 312 creates a Message 318 and posts it with the "Client" queue 310.

A "Client" MTO 320 retrieves the Message 318 posted with the "Client" queue 310 and retrieves "user records" and "user state rules" from the database 322, as represented by the Session Object 324. The "user records" contain information about a user such as the user's active telephone number or the time of day when the user may wish to be called. The "user state rules" signify the relationship of the user to IVEENA, for example, another task is in the process of calling the user on their telephone. At this point, the user state record is updated and another Application MTO that may be concurrently processing related information can use such state information to determine the proper course of action.

The "Client" MTO 320 creates a Message 326 containing the Application Context and posts it to an Application queue 328 that relates to the appropriate Application as determined by the user record and the type of incoming request. The Application Context is the collection of user and system information that define the context within which an application can perform a service for or on behalf of the user. For example, in the case of the "mailreader" application, the Application Context includes such information as the user's phone number and language and delivery preferences, and the Client MTO 320 posts the Message 326 to the "mailreader" Queue 328.

A Command Portal NCO 330 may also post an Application Context to the Application queue 328 via a message 332. The Command Portal NCO 330 is for external systems to activate an IVEENA application. For example, a Command Portal is provided as an interface to an enterprise or third-party Interactive Voice Response service. This portal enables users to call in to the IVEENA system to check for their email messages, to request that a stored message be sent to a fax machine, or to send a voice message to a group of users as a part of an email message.

The Application queue 328 instantiates an Application MTO 334 corresponding to this Application. The Application MTO 334 implements the Application logic. In the case of "mailreader," the email message for this user is retrieved from the Communication Server 300 via a message 336.

In most cases, the logic of the Application MTO 334 will include creation of an Alert record that is stored in a database 338 via a session object 340. In the case of "mailreader," the Alert record contains the relevant elements of a MIME encoded message (see Appendix A, item 17) such as email message header information, the text contained in the body of the email message, and attachments.

The Application Context includes policy information that governs the application. For example, the user may have a preference for receiving telephone calls at certain times of the day. The Application MTO 334 creates the appropriate "to-do" records for such activities as delayed execution, other activities, or to safeguard against system failures. Those "to-do" records are stored in the database 314 via a Session Object 342.

Figure 4:
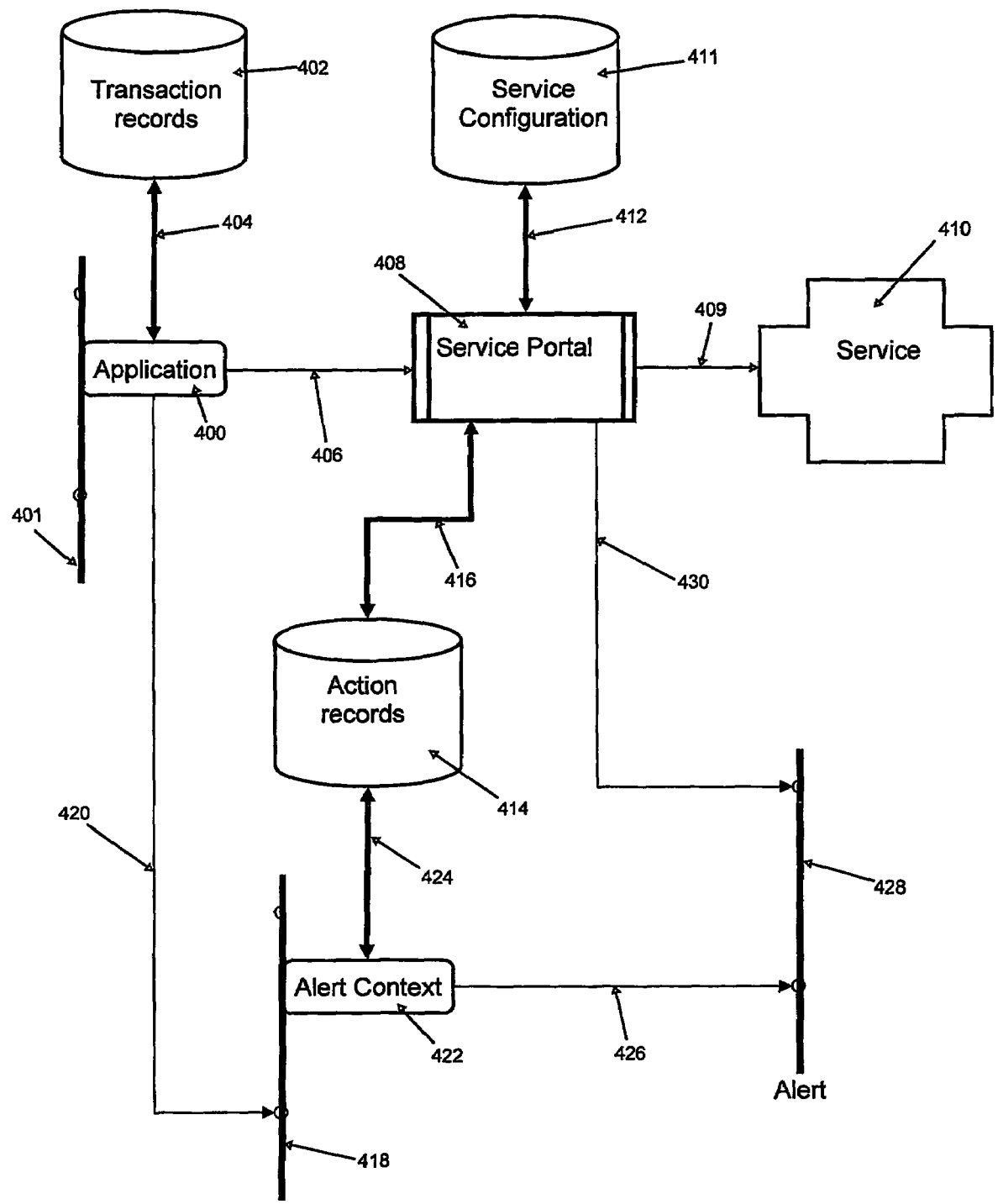
FIG. 4 outlines the process of preparing an Alert and activating a Service.

Steps Demonstrated in FIG. 4

Referring next to FIG. 4, the process of preparing an Alert and activating a Service (such as a service to convert a text message to voice and to deliver it via telephone, or a service to deliver a facsimile) is described next.

The Application MTO 400, which is associated with the Application Queue 401 implements the operational logic or functions that are performed by IVEENA on behalf of or for the user. When such activity is considered a transaction, the Application MTO 400 creates a user Transaction record in a database 402, as represented by the Session Object 404.

Next, via a message 406, the Application MTO 400 invokes one or more Service Portal NCOs 408. As depicted in FIG. 4, the Service Portal NCO 408 implements, via a message 409, the protocol to start a Service 410. Different protocols may be appropriate for different services and different vendors supplying similar services. For example, starting a Service to make a telephone call and deliver a voice message would start with authenticating a communication session and directing that Service to the proper location to retrieve the program containing the voice message. One provider of service that delivers a facsimile requires an email message with the appropriate content and headers, whereas a different provider may support a HTTP interface (see Appendix A, item 11).

The Service Portal NCO 408 retrieves the Service Configuration record for the Service from a database 411 via a Session Object 412, and creates the appropriate request protocol. The Service Portal NCO 408 may access or modify the Action records in a database 414 via a Session Object 416 at this point in the process based upon the requirements of the service request protocol.

The Application MTO 400 may post the Application Context to the Alert Context queue 418 via a message 420. An Alert Context MTO 422 is associated with the Alert Context queue 418, and is a mechanism for converting, via a Session Object 424, an Action record in the database 414 into an Alert that can be delivered to users. By providing for an abstract definition of an Alert that is independent of a specific application, IVEENA separates the process of message delivery from the policies that govern message delivery for a given organization or within the context of a given application.

The Alert Context MTO 422 implements the logic associated with an Alert as specified by the Application Context and creates an Alert Message 426. This may be a single email message that is converted to a menu that delivers the message to the user and requests a response, or it may be the next message in a series of messages that are to be delivered to multiple users according to a distribution scheme specified by the application. The processed Alert Message 426 is sent to an Alert queue 428.

As represented by the message 430, the Service Portal 408 may also create an Alert record for later delivery to a Service. A Service generally uses this interface for status update, where the Application Context is part of the request, for example, when the Service is processing a transaction and is requesting "the rest of" a data system.

Figure 5:
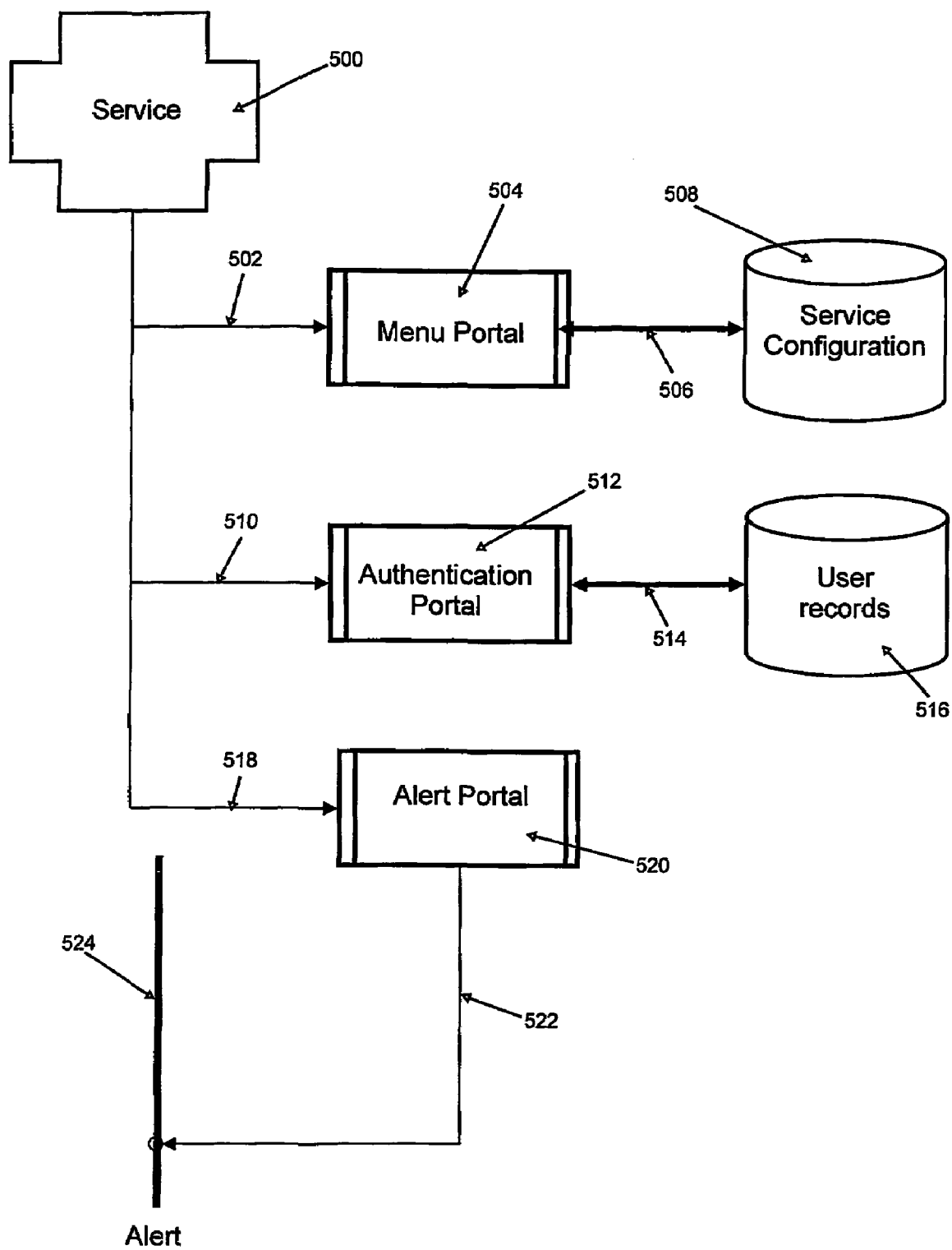
FIG. 5 outlines the process of authenticating the Service request and delivering the appropriate information to the Service.

Steps Demonstrated in FIG. 5

Referring next to FIG. 5, the process of authenticating the Service request and delivering the appropriate information to the Service, such as delivering voice menus or retrieving the alert for delivery by the voice service, is described next.

The IVEENA service interface provides for both "push" and "pull" models of interfacing to a network service. For example in the case of the "mailreader," the system may post a request to a Service to place a telephone call to a user (push), or a user may call the Service to find out if they have messages, whereby the Service posts a request to IVEENA (pull). IVEENA and a Service may use both of these models while delivering a single service to the user.

A Service communication protocol may require a service 500 to request information about its basic operational parameters. This request is represented in FIG. 5 by message 502. A Menu Portal 504 in IVEENA is a mechanism, specific to a service class, to accommodate this requirement.

The Menu Portal NCO 504 provides, via a Session Object 506, the information based on the parameters in the Service Configuration records in a Database 508. The Service Configuration records may be specific to a service, an organization, or user group, or to a specific user service class, to accommodate this requirement.

As represented by the message 510, an Authentication Portal NCO 512 provides a mechanism to validate a service state (such as a user's name and password). In general, the information from this portal is a time sensitive token that can be used to access or decrypt information that is delivered to the Service.

The Authentication Portal NCO 512 provides, via Session Object 514, authentication information based upon information in the User records in a Database 516. This capability enables an enterprise to enforce access policies in a structure that is independent of the actual flow of data within an information system.

Once validated, the Service 500 may request, via message 518, the content of the request from the Alert portal NCO 520. This information is usually requested by providing an encoded token such as a transaction ID that is used by the Alert Portal NCO 520 to fetch, via message 522, the proper information from an Alert queue 524.

Figure 6:
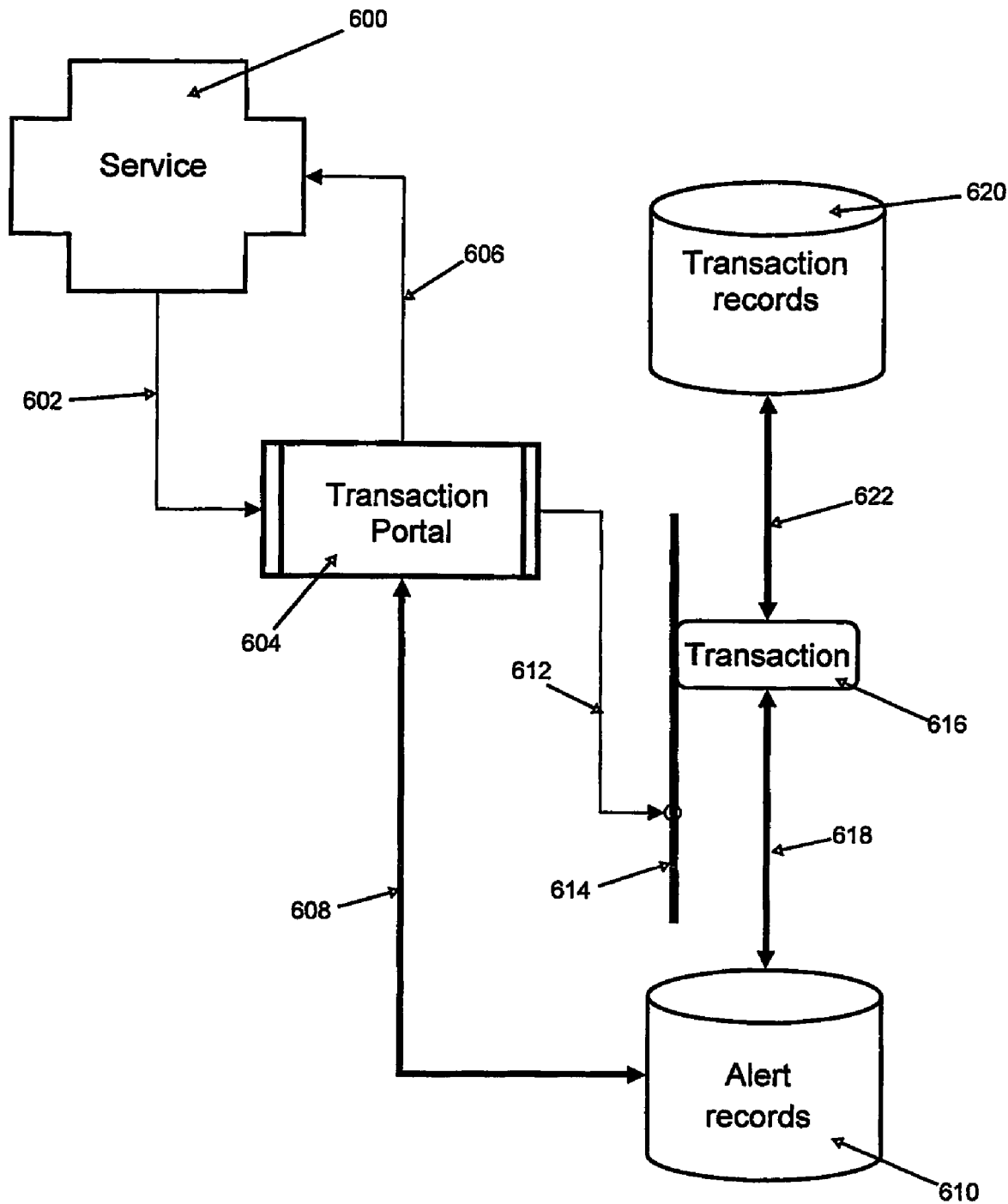
FIG. 6 outlines the process of storing the user's response and the transaction record.

Steps Demonstrated in FIG. 6

The IVEENA service handling model includes a mechanism for accepting intermediate as well as final responses from a Service 600. In certain cases, this information can serve to report on the state of a transaction or a group of transactions. In other cases, IVEENA will use this information to determine the flow of information within a single transaction.

The Service 600 posts a Message 602 to a Transaction Portal NCO 604. In the IVEENA Service model, multiple Transaction Portal NCOs may serve a Service, implementing, along with the service menu outlined in the message 502 (FIG. 5) the logic of processing a service transaction.

The Transaction Portal NCO 604 may respond to the Service 600 by providing additional service parameters or alterations to the Service flow via a message 606. The Transaction Portal NCO 604 may access, via a Session Object 608, the Alert records in a Database 610 when preparing this response. The Transaction Portal NCO 604 posts a Message 612 to the Transaction Queue 614 associated with this Service 600 or with the IVEENA application that is in progress.

A Transaction MTO 616 associated with the Transaction Queue 614 updates the Alert records in the database 610 via a Session Object 618. The Transaction MTO 616 associated with the Transaction Queue 614 updates the Transaction records in a database 620 via a Session Object 622.

Unique aspects of the invention include, but are not limited to, the combination of the above-mentioned components, the flow of the information as described above, the processing of messages that enable the system to process multiple requests concurrently and to recover from error conditions, and the support for implementing enterprise and service policies by identifying system and user behavior during the course of a transaction.

Although a number of embodiments of this invention have been described above with a certain degree of particularity, those skilled in the art could make numerous alterations to the disclosed embodiments without departing from the spirit or scope of this invention. For example, it is within the scope of the invention to use the IVEENA system to process transactions and any activity that involves the use of external resources in a way that simplifies integration with multiple back-end reporting and billing systems, including multi-level seller and reseller structures. It is intended that all matter contained in the above description or shown in the accompanying drawings shall be interpreted as illustrative only and not limiting. Changes in detail or structure may be made without departing from the spirit of the invention as defined in the appended claims.

The following publicly-available references are hereby incorporated by reference as though fully set forth herein:

1. Internet Engineering Taskforce, Post Office Protocol Version 3 (POP3), Internet Engineering Taskforce Request For Comments 1939 (ietf/rfc-1939) May 1996.

2. Internet Engineering Taskforce, Simple Mail Transfer Protocol (SMTP), Internet Engineering Taskforce Request For Comments 821 (ietf/rfc-821) August 1982.

3. ISO/IEC 9075:1992, Database Language SQL—Jul. 30, 1992.

4. Voice XML forum, Voice extensible Markup Language (VoiceXML) Specification 1.0, March 2000. Published by Voice XML forum, a program of IEEE Industry Standards and Technology Organization (IEEE-ISTO).

5. Sun MicroSystems, Inc., JavaBean™ specification version 1.01A August 1997, published by Sun MicroSystems, Inc. Graham Hamilton (Editor).

6. Dustin R. Callaway, Inside Servlets, Server Side Programming for the Java™ platform, 3$^{rd}$ Printing November 1999, Published by Addison Wesley Longman Inc. ISBN 0-201-37963-5.

7. Tom Valesky, Enterprise JavaBeans™ Developing Component-Based Distributed Applications 4$^{th}$ Printing November 1999, Published by Addison Wesley Longman Inc. ISBN 0-201-60446-9.

8. Jim Conallen Building Web Applications with UML 3$^{rd}$ Printing March 2000, Published by Addison Wesley Longman Inc. ISBN 0-201-61577-0.

9. Qusay H. Mahmoud Distributed Programming with Java ©2000, Published by Manning Publication Co. ISBN 1-8847777-65-1.

10. Network Working Group, Simple Network Management Protocol (SNMP) Request For Comments 1157 (ietf/rfc-1157) May 1990.

11. Network Working Group, Hypertext Transfer Protocol—HTTP/1.1 Request For Comments 2616 (W3c/rfc-2616) May 1990.

12. Defense Advanced Project Agency Transmission Control Protocol (TCP) DARPA Internet Program Protocol Specification ietf/rfc/793 September 1981.

13. J. Postel, ISI, User Datagram Protocol (UDP) rfc/0768 August 1980.

14. Extensible Markup Language (XML) 1.0 W3C Recommendation 6 Oct. 2000 http://www.w3.org/TR/2000/REC-xml-20001006.

15. Simple Object Access Protocol (SOAP) 1.1 W3C Note May 8, 2000, http://www.w3.org/TR/2000/NOTE-SOAP-20000508.

16. Sun MicroSystems, Inc., Java™ 2 Platform Enterprise Edition Specification version 1.4 Jul. 12, 2002, Bill Shannon Published by Sum Micro Systems, Inc.

17. RFC 1341—MIME (Multipurpose Internet Mail Extensions): Mechanisms for Specifying and Describing the Format of Internet Message Bodies.

What is claimed is:

1. A distributed notification system for delivering selected communications in real time to a recipient in an alternate communication format and/or via an alternate communication network, the system comprising;
   a communication server for receiving and storing an initial communication in a first format intended for a first destination over a first communication network;
   a selection module that screens said initial communication pursuant to a first set of rules defined by the recipient to determine whether said initial communication should be identified as a selected communication for alternate delivery;
   a rules database that stores recipient state information and a second set of rules, which are at least in part defined by the recipient, for application to said selected communication wherein said second set of rules, in conjunction with said recipient state information, determine said alternate communication format and/or said alternate communication network for delivery of said selected communication;
   a rules module that queries said rules database for said recipient state information and said second set of rules and instantiates an instruction application based on said recipient state information and said second set of rules to direct further processing of said selected communication;
   a service module that is invoked by said instruction application and that converts said selected communication from said first format to a second format; and
   a delivery module that automatically delivers said selected communication in said second format to a second destination directed by the instruction application according to said recipient state information and said second set of rules.

2. The system of claim 1, wherein said delivery module delivers said selected communication in said second format to said second destination over a second communication network.

3. The system of claim 1, wherein said service module further comprises a third party application service invoked temporarily by said instruction application to become part of the system, wherein said third party application service is connected with the communication server via a network;
   said third party application service receives said selected communication from said communication server via said network;
   said third party application service converts said selected communication from said first format to a second format; and
   said third party application service further functions as said delivery module and delivers said selected communication in said second format to said second destination pursuant to said recipient state information and said second set of rules.

4. The system of claim 3 fun her comprising a command interface accessible by said third party service application for instantiating an additional instruction application.

5. The system of claim 1 further comprising a scheduling module and an event database that stores event records, wherein said scheduling module queries said event database and independently instantiates said instruction application upon reaching an activation time for each of said event records.

6. The system of claim 1 further comprising a command interface accessible via a network through which the recipient of said selected message can amend at least one of said first set of rules and said second set of rules.

7. The system of claim 1 further comprising a command interface accessible via a network through which the recipient of said selected message can independently instantiate said instruction application.

8. The system of claim 1 further comprising a command interface accessible via a network through which an enterprise can amend at least one of said first set of rules and said second set of rules applicable to multiple recipients associated with the enterprise.

9. A method for providing select messages to a recipient in real time in an alternate communication format and/or via an alternate communication network, the method comprising;

receiving an initial communication in a first format intended for a first destination at a communication server via a first communication network;

screening said initial communication pursuant to a first set of rules defined, at least in part, by the recipient, to determine whether said initial communication should be identified as a selected communication for alternate delivery;

temporarily storing said selected communication at said communication server;

sending an alert message to a notification system to initiate a process for delivery of said selected communication in a second format;

querying a rules database for recipient state information and a second set of rules for application to said selected communication, wherein said second set of rules, in conjunction with said recipient state information, determine said alternate communication format, an alternate destination, and/or said alternate communication network for delivery of said selected communication;

converting said selected communication from said first format to a second format based upon said recipient state information and said second set of rules; and automatically delivering said selected communication in said second format to said alternate destination.

10. The method of claim 9, wherein said step of delivering further comprises delivering said selected communication in said second format over said alternate communication network.

11. The method of claim 9, wherein said step of converting further comprises:

temporarily invoking a third party application service to convert said selected communication from said first format to said second format; and transmitting said selected communication from said communication server to said third party application service via a network;

wherein said step of delivering is performed by said third party application service.

* * * * *